United States Patent [19]

Bonsack

[11] 4,279,871

[45] Jul. 21, 1981

[54] PROCESS FOR TREATING CHLORINATED TITANIFEROUS MATERIAL TO REMOVE VANADIUM

[75] Inventor: James P. Bonsack, Aberdeen, Md.

[73] Assignee: SCM Corporation, New York, N.Y.

[21] Appl. No.: 157,279

[22] Filed: Jun. 6, 1980

Related U.S. Application Data

[63] Continuation-in-part of Ser. No. 89,982, Oct. 31, 1979, abandoned.

[51] Int. Cl.$^3$ .................... C01G 23/047; C01G 31/04
[52] U.S. Cl. ........................................ 423/74; 423/62; 423/65; 423/77; 423/78; 423/492; 423/240; 75/1 T; 75/113
[58] Field of Search ............... 75/1 R, 1 T, 21, 84, 75/111–114; 423/62, 68, 69, 74–79, 240 R, 240 S, 492, 215.5; 55/69, 71

[56] References Cited

U.S. PATENT DOCUMENTS

| | | | |
|---|---|---|---|
| 2,682,930 | 7/1954 | Kichma | 423/492 |
| 3,149,911 | 9/1964 | Fomasieri et al. | 423/78 |
| 3,388,993 | 6/1968 | Petersen et al. | 55/71 |
| 3,389,957 | 6/1968 | Olds et al. | 423/62 |
| 3,466,169 | 9/1969 | Nowak et al. | 75/112 |
| 3,699,206 | 10/1972 | Dunn | 423/79 |
| 3,977,862 | 8/1976 | Glaeser | 75/1 T |
| 3,977,863 | 8/1976 | Glaeser | 75/1 T |
| 3,977,864 | 8/1976 | Glaeser | 75/1 T |
| 3,989,510 | 11/1976 | Othmer | 75/1 T |
| 4,169,135 | 9/1979 | Cotter et al. | 423/240 |

*Primary Examiner*—Herbert T. Carter
*Attorney, Agent, or Firm*—Merton H. Douthitt; Gordon P. Becker

[57] ABSTRACT

Vanadium impurities in chlorinated titaniferous materials are rendered easily removable by reacting said chlorinated titaniferous materials with a high surface area carbon at an elevated temperature. A process for preparing said high surface are a carbon is also described.

10 Claims, No Drawings

PROCESS FOR TREATING CHLORINATED TITANIFEROUS MATERIAL TO REMOVE VANADIUM

This is a continuation-in-part of application Ser. No. 089,982 filed Oct. 31, 1979 now abandoned.

BACKGROUND OF THE INVENTION

This invention relates to the separation of vanadium values from titanium values in mixtures of their respective chlorides.

Titaniferous materials are often subjected to chlorination, because it is an efficient and economical way to obtain a high purity titanium source for making titanium alloys, titanium compounds, and especially pigmentary titanium dioxide.

Several processes have been described in the art for the chlorination of titaniferous materials. Such processes generally react a titanium dioxide-providing raw material often containing iron values with a chlorine-providing material and a carbon-containing reductant according to one or both of the following equations:

$$TiO_2 + 2Cl_2(g) + C(s) \rightarrow TiCl_4(g) + CO_2(g)$$

$$TiO_2 + 2Cl_2(g) + 2C(s) \rightarrow TiCl_4(g) + 2CO(g)$$

Although the presence of iron is optional in the titanium-providing raw materials, most chlorination processes are effective for concomitantly chlorinating the Ti and Fe values of the feed materials as shown in the following reactions:

$$2FeTiO_3 + 6Cl_2(g) + 3C(s) \rightarrow 2TiCl_4(g) + 3CO_2(g) + 2FeCl_2$$

$$FeTiO_3 + 3Cl_2(g) + 3C(s) \rightarrow TiCl_4(g) + 3CO(g) + FeCl_2$$

Chlorination reactions are generally carried out at about 1000° C., but can be carried out at any temperature in the range from about 800° C. to about 2000° C., using various carbon reductants and chlorine sources, including chlorine gas and chlorine-providing compounds. The titaniferous materials to be chlorinated can be preformed into briquets or the process can be conducted in a fluid bed using granular materials. When a fluid-bed process is used, generally the chlorine-providing material is supplied to the bottom of the bed and product titanium tetrachloride ($TiCl_4$) is removed from the top. Fluidization is generally controlled such that the bed remains fluidized and yet fine, solid particulate materials are not carried out with the product.

Selective chlorination processes also exist and are designed to chlorinate only the Ti values or the Fe values of the raw material. A carbon reductant and a chlorine source are used and reaction temperatures are similar to non-selective processes. However, selective processes utilize a chlorine source consisting at least partially of iron chlorides or react the titaniferous raw materials in a dilute phase, or utilize an especially high temperature or a combination of these.

Such titaniferous materials also usually contain vanadium impurities which adversely affect the titanium products produced. For example, pigmentary $TiO_2$ can only tolerate about 10 ppm. vanadium in the titanium tetrachloride from which it is made without discoloration. Removal of such impurities has heretofore been a complicated and burdensome process because of the similarity between the chemical and physical characteristics of titanium and its compounds and vanadium and its compounds. For example, $TiCl_4$ melts at $-25°$ C. and boils at 136.4° C. and $VCl_4$ melts at $-28°$ C. and boils at 148.5° C. This parallelism of properties permeates a comparison of the compounds of these two elements. Therefore, in a conventional chlorination process the vanadium values in a titaniferous material react in substantially the same manner as the titanium values, and their respective chlorinated products have nearly identical chemical and physical properties. Therefore, it is extremely difficult to separate the undesirable chlorinated vanadium values from the desirable titanium values. Fractional distillation, for example, will remove most impurities from $TiCl_4$, but is ineffective for removing vanadium impurities.

Processes, which are used commercially, remove vanadium impurities from $TiCl_4$ by refluxing with copper, treating with $H_2S$ in the presence of a heavy metal soap, or treating with an alkali metal soap or oil to reduce vanadium to a less volatile form, each followed by a further distillation. However, the organic materials used tend to decompose and deposit sticky, adhering coatings on heat exchanger surfaces, pipes, and vessel walls. This causes shutdowns of the process and requires frequent maintenance of the equipment.

A simple, efficient, and economical process has now been discovered for separating the vanadium values from chlorinated titaniferous materials. This process utilizes a high surface area carbon. Said high surface area carbon is reacted with chlorinated titaniferous materials at a temperature in excess of about 500° C. The reaction with this high surface area carbon causes any vanadium values present to be reduced to a less volatile form so that they can be easily removed as a solid from the gaseous or liquid $TiCl_4$ product.

One advantage of the present process is that it can be performed in existing equipment for the chlorination of titaniferous material with very little modification. Another advantage is that it employs economical raw materials. Still another advantage is that the CO value of the tail gas produced is sufficiently enhanced such that said tail gases will support combustion and can be burned to effect conversion of CO to $CO_2$ and thus eliminate a pollution problem previously created.

SUMMARY OF THE INVENTION

A high surface area carbon is reacted with a chlorinated vanadium-containing titaniferous material at a temperature in excess of about 500° C. The reacted, chlorinated, titaniferous material is cooled to a temperature of less than about 450° C. forming a vanadium-containing phase separate from the chlorinated titanium product-containing phase, and the vanadium-containing phase is separated from the chlorinated titanium product-containing phase or phases.

DETAILED DESCRIPTION OF THE INVENTION

The present invention is a process for rendering vanadium impurities readily removal from chlorinated vanadium-containing titaniferous materials.

According to an embodiment, high surface area carbon is entrained in a gaseous chlorinated titaniferous product stream as it leaves the bed of reacting materials in the chlorinator. In another embodiment, a chlorinated product stream is passed through a bed of the high surface area carbonaceous material. In yet another embodiment, the chlorinated titaniferous material is cooled and then reheated to an appropriate temperature for reaction with the high surface area carbon. In each embodiment, it is important that the high surface area carbon reacts with the chlorinated titaniferous material at a temperature of at least about 500° C., and that the amount of high surface area carbon, its surface area, pore size, and pore size distribution are sufficient to cause the vanadium values to be reduced to a less volatile form. The carbon-containing reductant used in a conventional fluid-bed chlorination of titaniferous materials is typically a granular material which will substantially pass through an 8-mesh screen (U.S. Standard Sieve). Such materials, however, have a relatively low surface area, typically less than about 1.0 m$^2$/g. For example, granular petroleum coke has a surface area of less than 0.1 m$^2$/g., natural graphite about 0.4 m$^2$/g., and coke breeze about 0.3 m$^2$/g. However, carbons useful in the present invention have a surface area of at least about 10 m$^2$/g. The present high surface area carbons must also have sufficient average pore size and pore size distribution such that substantially all of this surface area can be utilized during the reaction. If, however, the surface area is at least about 100 m$^2$/g., then sufficient surface will be present for adequate reaction to take place regardless of the average pore size or pore size distribution. Surface area as expressed here and throughout this specification is "effective surface area" as determined from the N$_2$ adsorption isotherm at −195° C. and application of the standard BET procedure. The BET (Brunauer, Emmett, and Teller) method for surface area determination plots an adsorption isotherm under conditions for physical absorption only. Assurance of absolute accuracy is difficult due to the difficulty of measuring surface area in microporous materials.

The surface area of the high surface area carbon can be temperature dependent and therefore change during high temperature reaction. The change is dependent upon the preparation and origin of the carbonaceous material. Carbons with small pores (<20 Å diameter) tend to exhibit decreased surface area when heated to 1000° C. in N$_2$ (conditions similar to those encountered in the product stream as the chlorinated titaniferous material leaves chlorination reactor). It is believed the very small pores tend to close up and thus a lesser surface area is exposed. Also, carbons that have predominantly larger pores (>20 Å diameter) tend to exhibit increased surface area when heated to 1000° C. in N$_2$. In this case, the heat is believed to cause the evolution of more volatiles and thus create more pores and expose more surface.

Therefore, if a carbon has a surface area from 10 m$^2$/g. to 100 m$^2$/g., it must have a sufficient distribution of larger pores such that the surface area will not decrease below 10 m$^2$/g. and preferably increase when heated to reaction temperatures. Further, a carbon with a surface area of at least 100 m$^2$/g. will usually have sufficient surface area remaining after heating to reaction temperatures to be effective, regardless of pore size or distribution.

The amount of high surface area carbon utilized in this process can vary broadly. However, because the carbon also reacts with CO$_2$ in the product stream to form CO, there must at least be a stoichiometric amount to react with the CO$_2$. Excess, and even large excesses can also be used without being detrimental to the process. Reclaim and recycle of any excess is possible by use of a solid gas separator in the gaseous product stream, and if this is operated above 450° C., excess carbon can be recovered separate from the vanadium values.

A preferred high surface area carbon is coal treated to increase its surface area. Coal is a very inexpensive source of carbon and is readily available in granular or powdered form of various sizes and size distributions. Coal of −8 mesh (commercially known as #4 Buck) or finer is typical. The coal is treated by introducing it into a fluidized bed at an elevated temperature with air, CO$_2$ and/or stream until the surface area has increased sufficiently. About 5% or more of the coal by weight will be burned off during treatment. Generally to get a higher surface area, higher coal burn-off is required. Therefore, it is preferred to treat to the minimum effective surface area in order to obtain maximum yield from the raw materials. This treatment should be carried out above about 400° C. When steam or CO$_2$ is used, the reaction is endothermic, with air the reaction is exothermic and will maintain itself without the introduction of any outside heat source. Preferably, such process is carried out on a continuous basis with continuous feeding of coal and removal of treated coal product.

The control of average pore size and pore size distribution is difficult with this treatment process, and typically the average pore size produced (<about 20 Å diameter) is such that the surface area will decrease when heated in N$_2$ and all of the original surface area cannot readily participate in further reactions. Therefore, it is preferable to treat coal with this process until a surface area of at least about 100 m$^2$/g. is obtained such that average pore size and pore size distribution will not be factors in the effectiveness of the treated coal for use in the present invention.

The coal used is preferably high rank (anthracite) rather than low rank (bituminous) because the high rank coals attain a higher surface area during the above treatment. The coal introduced into the treatment process can be either wet or dry. Dry coal is actually preferred; however, wet granular or powdered coal is a much more readily available commercial product.

Other processes for preparing the high surface area carbons are readily available. Any available process for increasing the surface area of a carbonaceous material can be used, provided sufficiently high surface area or surface area, pore size, and pore size distribution combination are obtained. Such processes are typically used for producing activated carbon.

Commercially available activated carbons have surface areas from about 300 to about 3000 m$^2$/g. and are effective in the instant process. However, such materials are substantially more expensive at the present time than the above-described treated coals. Also, it has been found that the high surface area carbons useful in the present invention do not require the properties of activated carbon. Specifically, a carbonaceous material can be effective in the instant process without possessing any of the absorption or adsorption properties of activated carbons. The present process is not a sorption process.

If the high surface area carbon is to be entrained in the hot gaseous product stream, it is preferred that it be powdered rather than granular. Granular carbons are effective in other embodiments of the present invention. In a powdered form the carbon is carried along with the gaseous products. If the particles are too large, they will not be carried along and may not remain in contact with the products for sufficient time to be effective. Substantially passing through a 100-mesh screen is typical for powdered carbons, and even finer materials are common. In any event, the amount of carbon used is not as important as the surface area of that carbon.

When the process of the present invention is followed, it has been found that the chlorinated vanadium values produced are in a different physical form from the chlorinated titanium values. For example, between about 450° C. and 136° C., the chlorinated titanium values (primarily $TiCl_4$) are gaseous whereas the chlorinated vanadium values produced (believed to be $VCl_3$) are solid, and below about 136° C. to about −25° C.; the chlorinated titanium values are liquid, while the chlorinated vanadium values remain solid. Furthermore, the chlorinated vanadium values are insoluble in both the gaseous and the liquid chlorinated titanium values. Therefore, below about 450° C. a conventional solid-gas separation or solid-liquid separation is effective to remove the vanadium values contained in the chlorinated titaniferous material.

A preferred solid-gas separation is the use of a cyclone separator at a temperature of about 140° C. to about 350° C. and preferably about 200° C.; such separation is used in conventional chlorination processes to collect particulates in the $TiCl_4$ gas stream, but does not remove vanadium values during conventional processing.

Preferred solid-liquid separations are decanting and filtration. Again, such separations are often practiced during conventional chlorination processes, but do not remove vanadium values during such processing.

A further benefit derived from the reaction of the high surface area carbonaceous material with a titaniferous material after chlorination is an enhancement of the CO values of the tail gas produced. Tail gases are those gases that accompany the product as it leaves the chlorinator and must be disposed of as an effluent of the process. Specifically, the $CO_2:CO$ ratio in the tail gases of a conventional chlorination process is about 1 or 2:1. Such tail gas must be treated before being expelled into the environment because of the high CO level (about 33–50%). This gas cannot support combustion on its own; therefore, treatment by mere burning is precluded and other effective treatments are costly. However, when a high-surface area carbon is reacted with titaniferous material after the chlorination process according to the present invention, the $CO_2:CO$ ratio is reduced to about 0.01 or 0.02:1 (about 98 or 99 percent CO). Even though this tail gas contains substantially more CO than does the tail gas from the conventional process, it can be burned directly before expelling into the atmosphere as a means of treatment and thus is substantially easier and less expensive to treat than the tail gas of the conventional process. Alternatively, the CO-rich tail gas can be used for its fuel value by burning it in a boiler, kiln, or other.

The following examples will show ways in which this invention has been practiced. These examples are not intended to be limiting of the invention. In the examples, all temperatures are in degrees Centigrade and all percentages in parts by weight, unless otherwise specified.

EXAMPLE 1

Rutile ore containing about 96.1% $TiO_2$, about 1.2% $Fe_2O_3$, and about 0.4% $V_2O_5$ was chlorinated in a fluid-bed chlorinator at 1000° C. Chlorine gas and granular petroleum coke (−8 mesh) were used. The petroleum coke had a surface area of <0.1 $m^2/g$. A fluid-bed depth of 14–15 inches was maintained by continuously feeding fresh ore and petroleum coke. The chlorination was run for a period of about 3 hours, and the $CO_2:CO$ ratio in chlorinator tail gas was measured about every 10 minutes via gas chromatography.

The gaseous product stream was allowed to cool partially and was passed through a solid-gas cyclone-type separator. The temperature of the gas stream passing through the separator was controlled at about 175° C.; however, the actual temperature varied between 150° and 200° C. The solids collected in the separator contained mainly fluid-bed blow-over, and $FeCl_2$.

$TiCl_4$ was then condensed from the partially cooled product stream and solids were allowed to settle. The solids are present mainly due to the inefficiency of the cyclone separator. The clear liquid sample of supernatant $TiCl_4$ was poured off and analyzed for vanadium. Data from this chlorination are shown in Table I.

EXAMPLE 2

In the process of Example 1, powdered (95% past 100 mesh) commercial activated carbon made from lignite having a surface area of 530 $m^2/g$. was entrained in the chlorinated gaseous product stream as it left the hot fluid bed. Data from this chlorination are also shown in Table I.

TABLE I

| Example Number | Post-Chlorination High Surface Area Carbon Treatment | $CO_2:CO$ Average | Vanadium Impurity Level (ppm) |
|---|---|---|---|
| 1 | No | 2.2 | 780 |
| 2 | Yes | 0.006 | <5 |

It can be seen from the examples that the present process is effective for reacting and removing substantially all of the vanadium values present in the chlorinated titaniferous material.

A further aspect of the present invention relates to the temperature at which the vanadium values react with the high surface area carbon. Although this reaction temperature must be at least about 500° C., advantageously the reaction temperature is at least about 700° C. and preferably the reaction temperature is at least about 800° C. These later temperatures being typical of the reaction temperature when vanadium values are reacted with high surface area carbon shortly after escaping from the fluid-bed chlorinator.

What is claimed is:

1. A process for removing vanadium values from chlorinated vanadium-containing titaniferous materials, which comprises:
    reducing substantially all of said vanadium values to a less volatile form by reacting with an effective amount of a high surface area carbon at a temperature in excess of about 700° C., said high surface area carbon having a surface area of at least about 10 $m^2/g$.,
    cooling said chlorinated titaniferous materials containing reduced vanadium values to a temperature of less than about 450° C., producing a chlorinated reduced vanadium-values containing phase and a chlorinated titaniferous material-containing phase distinct from said chlorinated, reduced vanadium-values containing phase, and separating said chlorinated, reduced, vanadium-values containing phase from said chlorinated titaniferous material-containing phase.

2. The process of claim 1 wherein said reacting is at a temperature in excess of about 800° C.

3. The process of claim 1 wherein said high surface area carbon has a surface area of at least about 100 $m^2/g$.

4. The process of claim 1 wherein said chlorinated titaniferous material was chlorinated in a fluid-bed reactor.

5. The process of claim 1 wherein said high surface area carbon is derived from coal.

6. The process of claim 5 wherein said coal is treated with air, $CO_2$ and/or steam at a temperature in excess of about 400° C.

7. The process of claim 6 wherein said coal is treated until it obtains a surface area of at least about 100 $m^2/g$.

8. The process of claim 1 wherein said reducing is accomplished by entraining said high surface area carbon in a hot stream of said chlorinated titaniferous material.

9. The process of claim 1 wherein $CO_2$ is also present during said reducing and sufficient of said $CO_2$ is reduced to CO that tail gases from said process are combustible in air.

10. The process of claim 1 further comprising oxidizing said chlorinated, reduced, and separated titaniferous material-containing phase under oxidizing conditions to produce titanium dioxide.

* * * * *